Feb. 18, 1969      H. M. HAWKINS ET AL      3,428,619
SUSPENSION HANDLING

Filed May 27, 1965                          Sheet 1 of 3

FIG. 1

INVENTORS
H. M. HAWKINS
D. C. CHRISTENSEN
BY
Young and Quigg
ATTORNEYS

United States Patent Office 3,428,619
Patented Feb. 18, 1969

3,428,619
SUSPENSION HANDLING
Harold M. Hawkins and Don C. Christensen, Bartlesville, Okla., assignors to Phillips Petroleum Company, a corporation of Delaware
Filed May 27, 1965, Ser. No. 459,338
U.S. Cl. 260—93.7        8 Claims
Int. Cl. F26b *3/00;* B01d *43/00*

ABSTRACT OF THE DISCLOSURE

A method and apparatus for transferring a suspension of particles in a liquid from a zone of elevated pressure to a zone of lower pressure wherein the liquid is substantially vaporized and the particles dried during the transferring by use of a plurality of externally heated zones of varying size and by controlling the rate of flow of materials through the zones.

---

Figure 2:
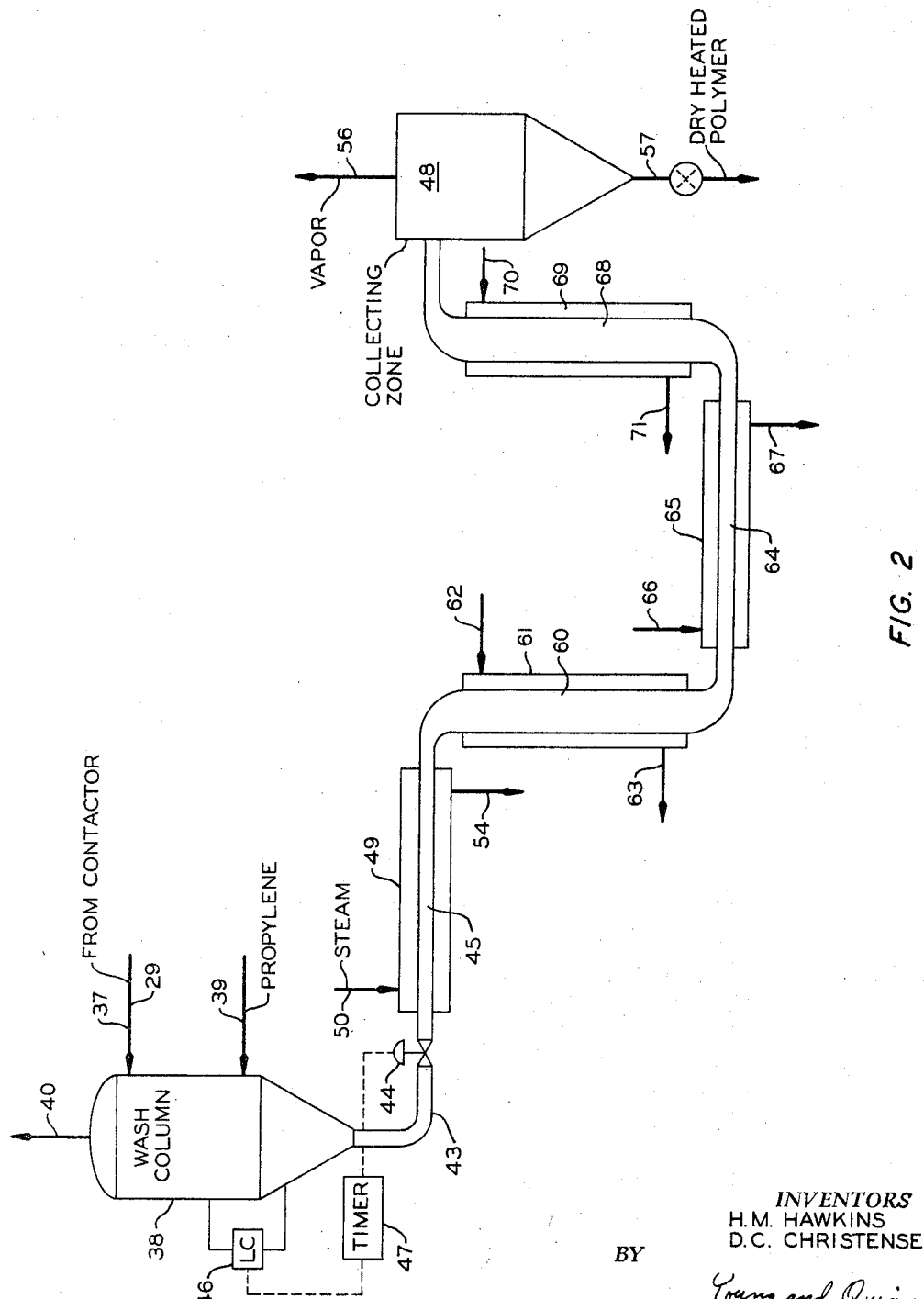

This invention relates to a method and apparatus for transferring suspensions from a zone of elevated pressure to a zone of lower pressure and treating same during such transferring.

Although this invention will be described in detail in reference to polymer suspensions, it should be noted that the invention is broadly applicable to the handling of any type suspension which is composed at least in part of solid particles in a liquid carrier which is vaporizable below the softening or melting temperature of the particles and which is to be transferred from a zone of elevated pressure to another zone of lower pressure.

In polymerization process, such as disclosed in U.S. Patent 3,001,978, issued to N. F. McLeod on Sept. 26, 1961, a reaction mixture can comprise a suspension of solid polymer particles in a liquid hydrocarbon diluent. The pressure in the reaction zone of such a process is generally at least that sufficient to maintain the hydocarbon diluent and reactants in the liquid phase and will ordinarily range from about 100 to about 700 p.s.i.a. In a continuous operation, the reaction mixture is usually removed to a flashing zone of relatively low pressure wherein part of the vaporizable components are removed from the polymer formed for reuse in the process. The material is then transferred to a secondary flashing zone wherein the remaining diluent is removed. The secondary flash zone is normally conducted at about atmospheric pressure. Transferring the polymer suspension from the reactor through the various stages of pressure reduction for removal of volatile materials presents a considerable problem in that bends in conduits, widened areas, conventional valves, and the like tend to become plugged with polymer particles that settle out of the suspension. Also, the life of valves and other components subjected to impingement tend to be significantly shortened due to the erosive nature of the suspension.

In order to alleviate the above wear and plugging problems it was conceived that such a suspension can be removed from the zone of high pressure to the zone of lower pressure by utilizing, at the entrance into the conduit which carries the suspension, a full opening valve which is actuated in a repeating timed cycle to either a fully opened or a fully closed position.

In order to augment or eliminate the separate flash steps for removal of vaporizable materials from the polymer, it was conceived to heat the conduit downstream of the intermittently operating valve in order to preheat and at least partially vaporize the liquid diluent in the conduit thereby decreasing the heat input load demanded of the separate flashing steps, and providing, overall, a more efficient operation. Obviously, to eliminate the conventional flashing steps requires the provision of a system capable of complete volatilization of reactants, diluents, etc., without overheating or melting the polymer and without allowing settling of polymer particles from the vaporized materials. However, due to the intermittent passing of the liquid-gas-solid suspension through the conduit, earlier attempts to perform this operation were not as efficient and trouble-free as was desired. Since there are periods of time during which substantially all of the constant diameter conduit is unoccupied by suspension and even though heat is applied thereto, substantially no heat is transferred to the suspension. Thus, more efficient utilization of heat transfer surface was needed.

For example, if the valve were operated on a 5-second cycle with a ½-second open time, in effect, the valve would be open and passing suspension into and through the conduit for only about 10 percent of the time. The valve would therefore be closed for 4½ seconds per cycle. Thus, only during a ½-second period would suspension be passing through the heated conduit and there would be a 4½-second lapse during which time the heat supplied to the conduit would not be absorbed to vaporize liquid. Thus, the intermittent flow of suspension through the heated conduit is thermally inefficient, the heating surface being utilizable for only about 10 percent of the time. As the result thereof, at times liquid was present with the polymer at the end of the conduit, and settling of particles with subsequent plugging was also observed.

It has now been found that if a suspension increment, from a zone maintained at a pressure of at least 100 p.s.i.a., is accelerated by a pressure drop across an intermittently operating expansion zone and then passed into a first, externally heated, confined, elongated zone maintained at elevated temperature and reduced pressure conditions to cause the velocity reached by the increment to approach sonic velocity, i.e., on the order of 400 to 700, preferably 500, feet per second in this zone, sufficient heat can be externally applied to the first zone to substantially completely volatilize or at least vaporize a substantial portion of the liquid present by the time the increment reaches the end of the first zone. The external heating of the zone is carried out at a temperature sufficiently elevated to vaporize the liquid present on the solid particles but below the softening temperature of those particles. It has also been found that if the vapor and solid particle increment from the first zone is passed into a second zone which is of a cross-sectional area greater than that of the first zone and which is maintained at elevated temperature and reduced pressure conditions to cause the velocity within the increment to be at least 50 feet per second at the end of the second zone, further pressure letdown to the desired pressure, i.e., slightly above atmospheric, is achieved and sufficient heat can be externally applied to the second zone to remove any residual liquid from the surface of and therefore dry the particles. This second zone can heat the particles themselves to a temperature of at least 100° F. but below the softening temperature of the particles. There is thus removed from the second zone vapors and dry, heated solid particles at substantially atmospheric pressure, i.e., 20-25 p.s.i.a.

By the above-described two-heating-zone embodiment of this invention and in the case of polymer suspensions, the need for the expensive flashing and drying operations of the prior art is significantly reduced. Also, the overall suspension handling operation is simplified by providing particle transport and liquid vaporization and at the same time eliminating the possibility of plug-up in the flashing or drying operation due to softened or melted particles. Further, the apparatus of this two-heating-zone embodiment is quite simple in that it requires no moving parts, no seals, is self-cleaning and is relatively inexpensive. Thus, this apparatus is a substantial improvement over known methods from both technical and economic points of view.

In a second embodiment of this invention it has been found that an even better suspension transferring and treating process is effected if the suspension increment is passed through an intermittently operating expansion zone and a first, elongated zone as described above and then downwardly into a substantially vertical, second, externally heated, confined, elongated zone having a volume sufficient to contain from 3 to 10 increments after passing through the first zone. It has been found that the flow of suspension through this second zone can be converted from an intermittent to a continuous and substantially steady flow if the pressure within the zone is maintained at substantially the same value as the pressure of the outlet end of the first zone and the rate of withdrawal of the mixture of increments from the bottom of this second zone is in the velocity range of from 1 to 6 feet per second. It has been found that under these conditions the length of the second zone can practically be such that only the largest and/or densest of the particles in a single increment will reach the bottom of the zone before the next following increment from the expansion zone reaches the top of the zone thereby providing a substantially uniform and constant flow of particles and vapors down the zone notwithstanding intermittent feed of increments to the top of the same zone. From the bottom of the second zone, a substantially uniform mixture of solid particles and vapor can be continuously removed to a third zone described later. The second zone is externally heated sufficiently to at least prevent condensation of the vapors present.

Thus, the intermittent flow of liquid-solid suspension is successfully transformed into a substantially steady flow of vapor and solids which can be more efficiently heated since the conduits carrying same are substantially always full of suspension and therefore heat supplied to these conduits will be transmitted to the suspension during the entire aforementioned valve cycle. Thus, a more efficient heating process is effected as compared to previous processes where the continuously heated conduit had only one increment of a ½-second duration passing therethrough every 5 seconds.

The effluent from the second zone passes to a heated, confined, third elongated zone which is maintained at a sufficiently reduced pressure relative to the second zone to move the vapor and solids at a velocity of from about 50 to about 400 feet per second. The third zone is externally heated to a temperature sufficient to vaporize any residual liquid present on the solid particles but below the softening temperature of those particles thereby producing a mixture of substantially all vapor and dry solid particles.

This mixture is then passed to an externally heated, confined, fourth zone of a length and/or vertical orientation such that the velocity of the vapor and solids passing therethrough does not decrease below the settling velocity of the particles, about 15 feet per second, before reaching the end thereof. In this zone the solid particles are themselves heated by the heat previously supplied to the vapors in the third zone since substantially all of the liquid has been vaporized. Thus, the particles themselves will be heated to a temperature of at least 150° F.

The mixture of vapor and heated solid particles is removed from the fourth conduit substantially at atmospheric pressure and passed to a collecting zone in which the vapors are separated and removed from the heated, dry particles and the particles are collected for withdrawal and subsequent processing as desired.

Thus, it can be seen that in addition to the advantages set forth above in reference to the two-heating-zone embodiment of this invention, the just-described four-heating-zone embodiment is an even more efficient combination of pressure letdown and heat exchange operations due to the conversion of the intermittent flow of suspension from the high pressure zone into a continuous flow of vapor and solids during transfer of the suspension to a collection zone for the solids. Thus, in the case of polymers, not only are the polymer particles produced free from associated diluent without the use of expensive flashing and drying steps but they are also heated to a temperature suitable for further processing at substantially atmospheric pressure. It should also be noted that the flashing and drying apparatus eliminated by this embodiment is replaced by simple, inexpensive and self-cleaning apparatus.

Accordingly, it is an object of this invention to provide a method and apparatus for transferring and treating a suspension from a zone of elevated pressure to another zone of lower pressure. It is another object of this invention to provide a simpler yet improved method and apparatus for transferring, depressurizing, drying, and heating polymer particles from the reactor in which they were formed.

Other aspects, objects and the several advantages of the invention will be apparent to those skilled in the art from the description and the appended claims.

FIGURE 1 diagrammatically represents a system employing the two-heating-zone embodiment of this invention.

FIGURE 2 diagrammatically represents a system employing the four-heating-zone embodiment of this invention.

Figure 3:
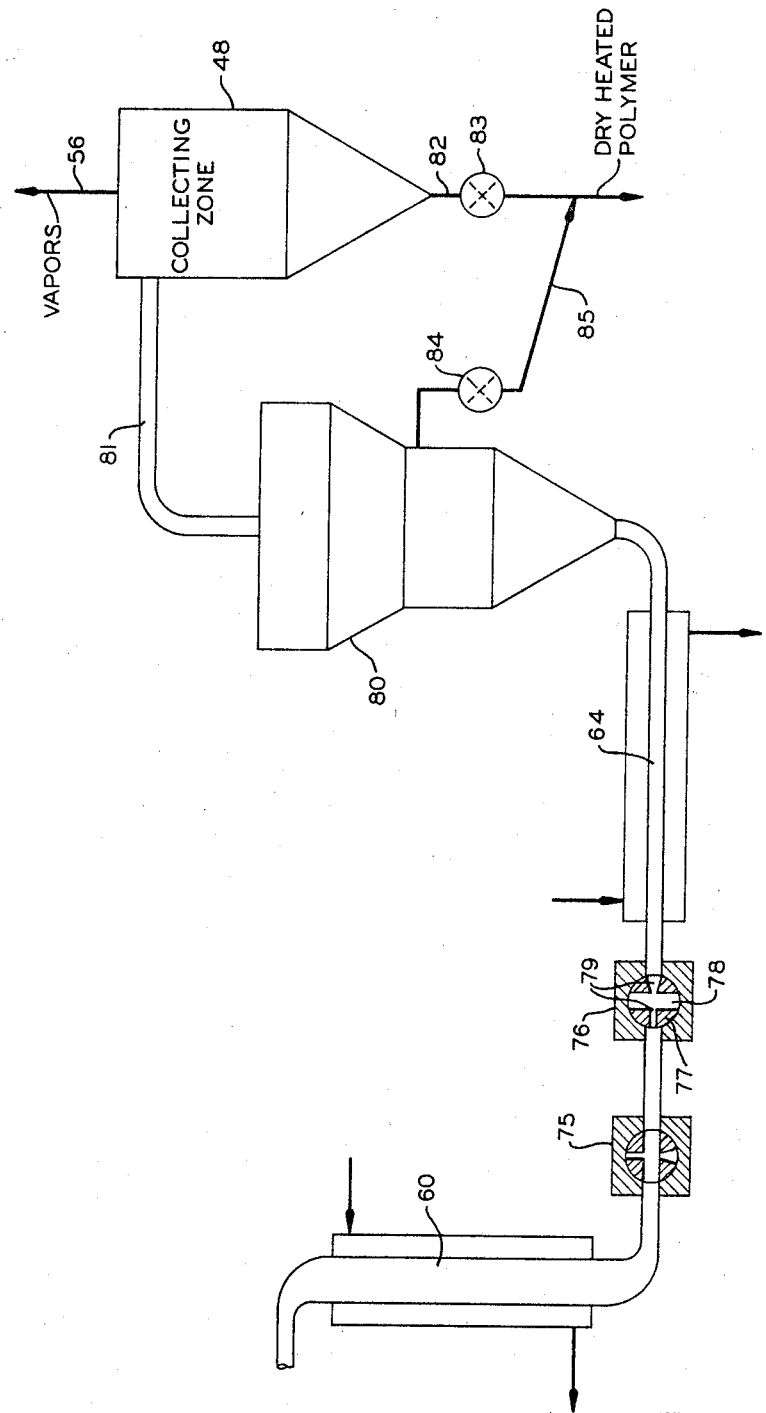

FIGURE 3 diagrammatically represents modification which can be applied to the embodiment of FIGURE 2.

Referring now to FIGURE 1, propylene is charged to reactors 10 through 11 after having had mixed therewith titanium trichloride catalyst component from 12 and polymer modifying hydrogen by 13. Another catalyst component such as diethylaluminum chloride is added by 14 to reactor 10.

Reactor 10 is a loop-type reactor comprising two loops each of which is composed of two straight legs 16 which can conveniently be in the form of elongated, jacketed pipe sections. The ends of the legs of the reactor are interconnected by means of L's 17 so as to provide a continuous flow path through the reactor. The reactor is provided with an impeller 19 which is operatively connected to a prime mover such as turbine 21. The operation of the impeller forces the materials through the reactor. Legs 16 are encompassed by heat exchange jackets 22 which are interconnected by means of line 23. Line 24 connected to the heat exchange jacket of at least one of the legs of the reactor provides means for introducing a coolant such as water to jackets 22. The coolant is removed from the jackets by line 26.

The effluent stream recovered from reactors 10 through 27 comprises solid polymer particles, catalyst residues, dissolved polymer, liquid reactants such as propylene and any other liquid diluent which may be present. Although it can vary widely, the stream generally contains from about 15 to about 50 weight percent of solid polymer particles. The effluent passes through heater 28 and then into contact tank 29 after having added thereto by 30 any desirable additive such as a catalyst residue extractant, e.g., acetylacetone.

In contact tank 29 the contents are mixed with a conventional stirrer 33. Additional heat is added to contact tank 29 as desired by passing propylene or other heating fluid or monomer thereinto by 34 and heater 36.

The treated effluent is withdrawn from an upper portion of contact tanks 29 through 37 and passed to wash column 38 wherein it is contacted countercurrently with liquid propylene from 39, propylene and washings being removed through 40 together with a small concentration of polymer fines carry-over which can be removed by subsequent filtering.

The slurry of solid, particle-form polymer in liquid propylene is withdrawn from wash column 38 through conduit 43 and intermittently-operated valve 44 which operates as a pressure letdown valve or expansion zone into jacketed pipe 45. The rate of withdrawal of the slurry from the wash column is controlled by solids level controller 46 which determines the solids-liquid interfacial level within wash column 38 and manipulates the timer 47 which actuates open-closed valve 44. Motor valve 44 is an on-off valve operating under instruction from timer 47 at a fixed frequency but with the duration of the valve opening being adjustable by level controller 46, manipulation of timer 47 percent-open-time. This in turn determines the proportion of the cycle time that motor valve 44 will remain open and therefore the size of the increment of slurry passed therethrough. A full and complete disclosure of an on-off motor valve and its operation is found in U.S. Patent 3,057,696 issued to N. F. McLeod on Oct. 9, 1962. The slurry of solid polypropylene particles in liquid propylene diluent in conduit 43 is reduced from the elevated pressure of from about 100 to about 700, preferably about 450 p.s.i.a., to substantially atmospheric pressure when received in collecting zone 48 and consequent vaporization of propylene is accomplished. It should be noted that the substantially-atmospheric pressure in collecting zone 48 should be sufficient to cause the discharge of polymer and gases from that zone to downstream facilities and to prevent exposure of hot polymer to air, but is preferably not more than 25 p.s.i.a.

The pressurized particulate suspension increment in 43 after passing through intermittently-operating valve (expansion zone) 44 into pipe 45 is accelerated to a velocity approaching sonic velocity, above defined, by the combined action of the volumetric expansion of the increment due to the reduced pressure in the zone and the adiabatic vaporization of the liquid. The pressure maintained in pipe 45 will vary greatly depending on the materials present and the temperature of those materials; however, if the pressure is adjusted so that the increment passing through the pipe reaches at least 400 feet per second near the downstream end of the pipe the results of this invention are realized. Heat is externally applied to pipe 45 by passing heating medium such as steam into jacket 49 by line 50. The heating medium passing into jacket 49 and providing the external heating for pipe 45 is at a temperature sufficiently elevated to readily vaporize the liquid present in pipe 45 but below the softening temperature of the solid particles also in pipe 45. This temperature depends upon the polymer or other material being processed but generally can be from about 212 to about 350° F., preferably from about 225 to about 275° F. When pipe 45 is externally heated to a temperature within the above range, liquid vaporization due to this external heating when added to that from adiabatic vaporization effected by pressure reduction on the increment is sufficient to volatilize a substantial fraction of the liquid present in pipe 45 at least by the time the increment reaches the end of that pipe. Cooled and/or condensed heating fluid is withdrawn by 54.

The vapor and solid particle increment from pipe 45 then passes into larger diameter jacketed pipe 51 wherein the pressure is maintained at a value sufficiently less than that in pipe 45 and the temperature is maintained at a value sufficiently high to cause a velocity of the vapor and solids of at least 50 feet per second when valve 44 is open, and to substantially completely vaporize the remaining liquid and heat the solids themselves. The velocity is substantially zero when valve 44 is closed. Pipe 51 can generally be heated to a temperature of from about 150 to about 300° F., preferably from about 200 to about 250° F. The pressure of the gas hereinbefore described as existing at the exit of pipe 45 is reduced in passage through pipe 51 to a value slightly super atmospheric, in the range of 15 to 25 p.s.i.a., preferably about 20 p.s.i.a. Jacketed pipe 51 is externally heated by passing heating fluid through 52 into jacket 53 and out of jacket 53 by 55. With the velocity maintained at or above 50 feet per second in jacketed pipe 51, the pressure is let down to the desired, substantially atmospheric, pressure in collecting zone 48.

The vapor associated with the polypropylene particles is removed from collecting zone 48 by 56 and dry, heated solid polymer particles at substantially atmospheric pressure are removed through valved line 57.

It should be noted that the system shown in FIGURE 1 operates only intermittently and therefore passes one increment at a time through pipes 45 and 51 to collecting zone 48.

In FIGURE 2 the effluent from contact tank 29 passes through line 37 into wash column 38 in which it is contacted countercurrently with liquid propylene from 39, propylene and washings being removed through 40. The slurry is removed from wash column 38 through 43 under the influence of solids level controller 46 which manipulates timer 47, actuating control valve 44. The increment from valve 44 passes through pipe 45 at velocities, temperatures and pressures approximately equal to those described above and is treated in a similar manner as before.

The vapor and solids increment from pipe 45 then passes into larger diameter, substantially vertical, jacketed pipe 60. The increment passing into the top of pipe 60 will be decelerated therein and thereby subjected to a storage delay by the volume of pipe 60. The volume of this zone should be sufficient to hold from 3 to 10 increments from pipe 45. The pressure in pipe 60 is dependent on the rate of flow of material through and the back pressure in line 64. Generally this downstream pressure will be from about 40 to about 50 p.s.i.a. When properly operated, the largest and/or densest particles in the increment will, under these conditions, reach the bottom of jacketed pipe 60 at or just before the next following increment from jacketed pipe 45 reaches the top of jacketed pipe 60 so that continuous flow of nearly constant velocity is created and no deposition of particles within the conduits is encountered. Jacketed pipe 60 is heated by a heating medium passing into and out of jacket 61 by lines 62 and 63, respectively. The temperature of this heating medium should be at least that sufficient to prevent the vapors in jacketed pipe 60 from condensing and will be from about 212 to about 350° F., preferably from about 225 to about 275° F.

A mixture of solid particles and vapor is continuously removed from the bottom of pipe 60 preferably at a rate of from about 1 to about 6 feet per second into smaller diameter jacketed pipe 64 which is maintained at a pressure sufficiently lower than the pressure maintained in pipe 60 so that continuous flow of nearly constant velocity therethrough at a velocity of from about 50 to about 400 feet per second. Generally a pressure drop of about 25 p.s.i.a. is sufficient to maintain the above velocities. Pipe 64 is externally heated by means of jacket 65 and heating fluid inlet and outlet lines 66 and 67, respectively, to a temperature at least sufficient to prevent condensation of the vapors present in pipe 64. Generally, the major portion of the heat added is put in at pipe 64. Pipe 64 is continuously filled with a mixture of solid polypropylene particles and vapor and the heat applied thereto from jacket 65 is continuously transmitted to this mixture. Pipe 64, due to its smaller cross-sectional area and length, serves to maintain the pressure in pipe 60 and to vaporize any residual liquid present on the solid particles.

The mixture of vapor and dry solid polypropylene particles passes into larger diameter jacketed pipe 68 which is of a sufficient cross-sectional area or sufficiently vertical or both to slow the stream of vapor and solids to a velocity which provides a residence time for the vapor and solids of from 2 to 10 seconds. Generally the velocity will be from 15 feet per second to about 90 feet per second. Since the solid particles were dried of residual liquid by pipe 64, the particles themselves will be heated by a heating medium passing into and out of jacket 69 by lines 70 and 71, respectively. Thus, the solid polypropylene particles dried in pipe 64 are heated in pipe 68 and passed into collecting zone 48 at substantially atmospheric pressure. In collecting zone 48 vapor is removed by 56 and dry, heated particles removed by valved line 57.

Pipe 68 should heat the particles to an average temperature of at least 200° F. but should not heat the particles to a temperature within 20° F. of their softening temperature. Generally, pipe 68 can be heated to from about 212 to about 350° F., preferably from about 225 to 275° F.

In FIGURE 3 there is shown a series of ball valves 75 and 76. These valves each contain a rotatable member 77 of circular cross-section having crossing orifices 78 and 79. Orifice 78 is of a constant cross-section and equal in cross-sectional area to jacketed pipe 64 so that, when this orifice is aligned with jacketed pipe 64, valve 76 offers no resistance to the material flowing therethrough. Orifice 79 is partially of a smaller cross-sectional area than jacketed pipe 64 except at the downstream end thereof whereat the aperture is of a conically enlarging cross-sectional area which enlargement approaches, in cross-sectional area, the cross-sectional area of jacketed pipe 64. Thus, orifice 79 provides, when aligned with jacketed pipe 64, a resistance to the flow of material therethrough and, due to the tapered section, acts as a contraction zone for effecting an acceleration of the material passing therethrough with a deceleration after the material leaves the zone. Thus, this orifice supplements the pressure reduction function of jacketed pipe 64 and it can be used to eliminate a part of the length of that pipe and may be positioned to achieve a desired pressure profile through the letdown, vaporizing system as may be necessitated by moderate changes in polymer slurry throughput rate. One or more of these valves can be used. If a series of valves is employed, like orifices can be put on stream or a mixture of like and unlike orifices can be put on stream to lend flexibility to the pressure reduction capabilities of the system. The ratio of the smallest diameter to the largest diameter, i.e., the diameter of pipe 64, of orifice 79 should be no more than 1 to 2 and is preferably less in order to obtain a significant pressure drop. The use of a multiplicity of such valves can be desirable so that any one orifice 79 need not be too small and thereby risk the plugging thereof by buildup of particles passing therethrough.

If a residence time of longer than 10 seconds is required in pipe 68 of FIGURE 2 in order to thoroughly heat the solid polypropylene particles therein, the length and the preferred vertical orientation of pipe 68 required to effect such a residence time becomes impractical. Thus, in lieu of jacketed pipe 68 there can be utilized, as shown in FIGURE 3, a heated, fluidized bed or other suitable transport-drying means 80 in order to effect this longer residence time. In lieu of external wall heating of fluidized dryer 80, or the use of heating tubes within the fluid bed, the heat input from jacketed pipe 64 may be increased so as to insure that there is enough heat in the vapor-solid particle effluent of jacketed pipe 64 to heat the solid particles if they are maintained in the effluent for a sufficiently long period of time. By utilizing the fluidized bed, residence times of as high as 30 minutes can be achieved thereby insuring that the solid particles passing through 81 into collecting zone 48 will be thoroughly heated. When employing a fluidized bed or other similar means it can become necessary to enlarge the volume of pipe 60 to a degree sufficient to insure a substantially constant flow, i.e., ±10 percent of the average value, through jacketed pipe 64. At reduced rates of flow of suspension through the system of pipes and fluidized bed 80, hydrocarbon vapor, such as compressed and heated recycle from conduit 56, can be supplied to fluidized heater-dryer 80 to maintain the proper fluidized character of the bed. Supplementary fluidizing-heating-drying gas may be supplied from other external sources as desired so long as the externally-supplied gas is compatible with the diluent vapor.

Vapor is removed from collecting zone 48 by 56 and dry, heated solid polypropylene particles are removed from collecting zone 48 by line 82 in which there is a rotary valve 83. Polypropylene particles are also removed from the fluidized zone of fluidized bed 80 through rotary valve 84 and added to the particles in line 82 by line 85.

Many types of solid particles can be treated in accordance with this invention. Generally, it is preferred to treat solid polymer particles such as are prepared from one or more mono-1-olefins. Preferably, the mono-1-olefins have from 2 to 8 carbon atoms per molecule and include such monomers as ethylene, propylene, 1-butene, 1-pentene, 3-methyl-1-butene and the like. By use of the term "polymers" it is meant to include both homopolymers and copolymers of two or more of the monomers employed.

Also, the physical nature of the particles can determine whether two or four zone systems should be employed. For example, when porous, easy drying particles are present in a relatively volatile solvent, two zones can be sufficient whereas for particles that are more difficult to dry a four-zone system can be necessary. In extremely hard drying cases the fluidized bed of FIGURE 3 can be necessary.

A wide variety of catalyst systems have been employed in the polymerization of mono-1-olefins. One particularly suitable catalyst is described in Hogan et al., U.S. Pat. No. 2,825,721. Other catalyst systems suitable for such use are those broadly defined as comprising an organo-metal and a metal salt. A particularly suitable catalyst for the polymerization of propylene is one which comprises (a) a compound having the formula $R_nMX_m$, wherein R is an alkyl, cycloalkyl, or aryl radical or combinations of these radicals, such as alkaryl, aralkyl and alkylcycloalkyl, X is hydrogen or a halogen, including chlorine, bromine, iodine and fluoride, M is aluminum, gallium, indium or thallium, $n$ is from 1 to 3, inclusive, $m$ is from 0 to 2, inclusive, and the sum of $m$ and $n$ is equal to the valence of the metal M and (b) a halide of a metal of Group IV–B, V–B, VI–B or VIII, Handbook of Chemistry and Physics, 45th edition, 1964, p. B–2. The hydrocarbon radicals which can be substituted for R in the aforementioned formula (a) include radicals having up to about 20 carbon atoms each. Radicals having 10 carbon atoms or less are preferred since the resulting catalyst composition has a greater activity for initiating the polymerization.

A preferred catalyst system employed in the polymerization of propylene in a mass system comprises diethylaluminum chloride and a complex having the approximate formula $3TiCl_3 \cdot AlCl_3$ which can be prepared by the reaction of Al with $TiCl_4$.

Subsequent to the polymerization step, a number of methods have been proposed for the removal of the catalyst residue from the polymer, e.g., by extraction with a suitable extractant including aliphatic alcohols, carboxylic acids and hydroxy-substituted carboxylic acids, anhydrides of said acids and mixtures thereof. The presently preferred components are acetylacetone and propylene oxide.

The conditions employed in conducting the polymerization will vary depending upon the monomer, catalyst, diluents, etc., employed and the results desired. The polymerization temperature is generally in the range of from about 0 to about 160° F. and, in the case of propylene, is in the range of from about 90 to about 160° F. Generally, all that is required is that the polymerization be conducted at a temperature such that solid polymer in particle form is obtained. The pressure employed is that sufficient to maintain the reactants in the liquid phase and, in the case of propylene, will generally have a lower limit of about 225 p.s.i.g. at 90° F. but with hydrogen present and employing a liquid full reactor is desirably above 350 p.s.i.g. Residence time in the reactor can also vary but will generally be of a value between a few minutes and about 5 hours. Although the effluent from reactor 10 can be introduced directly into contact tank 29 without prior heating, subsequent catalyst removal operations are improved if the temperature in contact tank 29 is slightly higher than the polymerization temperature, i.e., at least 10° F. higher. In the case of polypropylene, the effluent is usually heated to a temperature in the range of from about 100 to about 170° F. before introduction into contact tank 29. The pressure in contact tank 29 need only be that sufficient to maintain the materials present in the liquid phase. The extractant can be introduced into line 27 by line 30 in undiluted form or as a solution in hydrocarbon which is inert to (or the same as) the reactants and in an amount of from about 1 to about 5 times the stoichiometric equivalent of the amount of catalyst present. Contact times in 29 can vary widely, but generally will be from about 5 minutes to about one hour. The liquid alternatively utilized to heat contact tank 29 by passing thereunto into line 34 and heater 36 can be the monomer employed, e.g., propylene, or a paraffinic hydrocarbon containing from 4 to 6 carbon atoms per molecule, e.g., n-pentane, n-hexane, and the like. Similarly, the wash liquid introduced through 39 into wash column 38 can be the monomer, e.g., propylene, or a paraffinic hydrocarbon containing from 4 to 6 carbon atoms per molecule, e.g., n-pentane and the like. Washing time in column 38 can vary widely but generally will be in the range of from about 5 minutes to about one hour at pressures sufficient to maintain the materials present in the liquid form.

Example I

Propylene is polymerized in reactor 10 of FIGURE 1 in the presence of hydrogen and a catalyst consisting of diethylaluminum chloride and a titanium trichloride complex which complex is prepared by reacting titanium tetrachloride and aluminum to yield a complex comprising 4.7 weight percent aluminum, 25.4 weight percent titanium and 69.5 weight percent chlorine. About 0.02 pound of diethylaluminum chloride and 0.03 pound of titanium trichloride complex per 100 pounds of propylene are introduced into reactor 10 which is operated at a temperature of about 115° F. and a pressure of about 440 p.s.i.a. The average residence time of the reactants in the reactor is about three hours and the effluent containing solid polymer in particle form, liquid propylene, catalyst residues and soluble polymer is removed as a stream containing from about 25 to about 35 weight percent solid polymer. Acetylacetone and propylene oxide are added to the stream and the composite is introduced into contact tank 29 which is operated at a temperature of about 135° F. and a pressure of about 430 p.s.i.a. The temperature in the contact tank is maintained at 135° F. passing hot water through a jacket surrounding the tank. After contact time of about 40 minutes the material is passed into the wash column and therein contacted countercurrently with liquid propylene at a temperature of about 70° F. and a pressure of about 420 p.s.i.a Valve 44 operates on a 5-second cycle in which it is wide open for ½ second and closed for 4½ seconds thereby injecting as each increment about 11 pounds of a 50 percent solid polymer slurry into jacketed pipe 45 at 420 p.s.i.a. every 4½ seconds. Pipe 45 has a diameter of 1 inch and a length of 70 feet. Pipe 45 is externally heated with about 250° F. steam passing into and condensing in jacket 49 thereof. The increment from pipe 45 enters pipe 51 which has a diameter of 3 inches and a length of 100 feet, and achieves therein a velocity of about 75 feet per second during that portion of the cycle when the valve is open. The increment enters pipe 51 at a pressure of about 70 p.s.i.a. and a temperature of about 70° F. In pipe 51 the increment is reduced to a pressure of about 20 p.s.i.a. and is heated to a temperature of about 120° F. by 275° F. steam passing into and condensing in jacket 53.

The effluent from jacketed pipe 51 is discharged into collecting zone 48 from which essentially propylene vapor is removed by 56 and solid polypropylene particles, which are thoroughly dried of liquid propylene and heated to a temperature of about 120° F., are removed by valved pipe 57.

Example II

A solid propylene polymer slurry was formed in the manner of Example I and passed through valve 44 and pipe 45, which is, in this example, one inch in diameter and 100 feet long. The increments from pipe 45 enter pipe 60, which is 18 inches in diameter and 70 feet long, at a pressure between 40 and 50 p.s.i.a. Pipe 60 is heated by 250° F. steam in jacket 61 thereof.

The effluent from the bottom of jacketed pipe 60 at a velocity of 3 feet per second is passed into pipe 64, which has a diameter of 1½ inches and a length of 70 feet. Pipe 64 is heated with 250° F. steam in jacket 65 thereof.

Pipe 64 discharges into pipe 68 where the inlet pressure is about 20.2 p.s.i.a. which falls to about 20 p.s.i.a. at the downstream end and is heated therein by 250° F. steam passing through jacket 69 thereof. Pipe 68 has a diameter of 4 inches and a length of 140 feet.

Collecting zone 48 receives a mixture of propylene vapor and heated solid polypropylene particles at a temperature of 180° F. and a pressure of 20 p.s.i.a.

Reasonable variations and modifications are possible within the scope of this disclosure without departing from the spirit and scope thereof.

We claim:
1. A method for transferring a slurry of meltable solid particles in a hydrocarbon which is vaporizable below the softening point of said particles from a zone of pressure of at least 100 p.s.i.a. to a zone of lower pressure comprising intermittently passing an increment of said pressurized slurry through an expansion zone, passing said increment from said expansion zone into a first elongated zone maintained at an elevated temperature and a reduced pressure sufficient to volatilize liquid from said slurry and accelerate said slurry to a velocity approaching sonic velocity before reaching the end of said first zone, passing the increment from said first zone to a second elongated zone of larger volume than said first zone, externally heating said second zone to an elevated temperature sufficient to vaporize any residual liquid, maintaining said second zone at a pressure sufficiently below that of said first zone to move said effluent through said second zone at a velocity of at least 50 feet per second and to produce a pressure at the downstream end of second zone which is substantially atmospheric, and recovering from said second zone vapor and dry, heated solid particles substantially at atmospheric pressure.

2. A method for depressurizing, drying, heating and recovering meltable solid particles from a slurry of same in a hydrocarbon liquid vaporizable below the softening point of said particles, said slurry being in a zone maintained at a pressure of at least 100 p.s.i.a., comprising intermittently passing an increment of said pressurized slurry through an expansion zone into a first elongated confined zone, externally heating said first zone to an elevated temperature sufficient to volatilize said liquid but below the softening point of said particles and employing a reduced pressure in said first zone relative to said pressurized slurry sufficient to accelerate said increment to a maximum velocity of at least 400 feet per second before reaching the end of said first zone, to thereby vaporize a substantial portion of the liquid in said increment by the time said increment reaches the end of said first zone, passing the vaporous-solid particle increment from said first zone to a second, confined elongated zone of larger volume, heating said second zone to an elevated temperature sufficient to vaporize any residual liquid from said particles and to heat the particles themselves to at least 100° F., employing a reduced pressure in said second zone relative to said first zone, said external heating and reduced pressure in said second zone being sufficient to maintain said vaporous-solid particle increment at a velocity of at least 50 feet per second and to reduce the pressure on said mixture at the end of said zone to substantially atmospheric, discharging an effluent of vaporous diluent and reactant and dry, heated solid particles from said second zone into a collecting zone and recovering therefrom dry, heated solid particles at atmospheric pressures.

3. A method for depressurizing, drying, heating and recovering meltable solid polymer particles from a slurry of same in liquid hydrocarbon diluent and reactant both of which vaporize below the softening point of said particles, said slurry being in a zone maintained at a pressure of from about 100 to 700 p.s.i.a., comprising intermittently passing an increment of said pressurized slurry through an expansion zone into a first, heated, confined pipe zone, externally heating said first zone to a temperature of about 250° F., moving said increment along said first zone with a pressure gradient sufficient to accelerate said increment to a maximum velocity of at least 400 feet per second before reaching the end of said first zone, passing the increment from said first zone to a second, heated, confined pipe zone having a diameter of three times that of said first zone, heating said second zone to a temperature of at least 175° F., moving said effluent along said second zone with a pressure gradient sufficient to maintain said effluent at least at 50 feet per second, discharging the effluent from said second zone into a collecting zone maintained at a pressure substantially atmospheric.

4. The method according to claim 3 wherein said polymer particles are polypropylene.

5. A method for transferring a slurry of meltable solid particles in a liquid hydrocarbon from a zone of pressure of at least 100 p.s.i.a. to a zone of lower pressure comprising intermittently passing an increment of said pressurized slurry through an expansion zone, passing said increment from said expansion zone into a first elongated zone maintained at an elevated temperature and a reduced pressure sufficient to vaporize said liquid and accelerate said slurry to a maximum velocity of a least 400 feet per second elongated before reaching the end of said first zone, passing the increment from said first zone downwardly into a substantially vertical second zone, maintaining said second zone at a pressure substantially equal to the outlet pressure of said first zone, heating said second zone at a temperature at least sufficient to prevent condensation of vapors therein, continuously removing from the bottom of said second zone a mixture of vapors and solid particles and passing same to a third elongated zone maintained at an elevated temperature and a reduced pressure sufficent to vaporize residual liquid present on said particles and to maintain the flow of vapors and particles through said second zone at a velocity of from about 50 to about 400 feet per second, passing the effluent from said third zone into a fourth elongated zone of sufficient size to slow same to a velocity of from 15 to less than 100 feet per second and reduce the pressure of said effluent substantially to atmospheric, discharging the effluent of vapor and dry, heated solid polymers from said fourth zone into a collecting zone maintained at substantially atmospheric pressure.

6. A method for depressurizing, drying, heating and recovering meltable solid particles from a slurry of same in hydrocarbon liquid vaporizable below the softening point of said particles, said slurry being in a zone maintained at a pressure of at least 100 p.s.i.a., comprising intermittently passing an increment of said pressurized slurry through an expansion zone into a first, heated, confined elongated zone, externally heating said first zone to an elevated temperature sufficient to vaporize said liquid but substantially below the softening point of said particles and employing a reduced pressure in said first zone relative to said pressurized slurry sufficient to accelerate said increment to a maximum velocity of at least 400 feet per second before reaching the end of said first zone, to thereby vaporize a substantial portion of the liquid in said increment by the time said increment reaches the end of said first zone, passing the vaporous-solid particle increment from said first zone downwardly into a substantially vertical, second, heated, confined elongated zone of larger volume than said first zone, maintaining said second zone at a pressure in the range of from about 40 to about 50 p.s.i.a. so that no more than the largest and densest particles present in the increment will reach the bottom of said second zone before the next following increment from said first zone reaches the top of said second zone, heating said second zone at a temperature at least sufficient to prevent condensation of vapors, continuously removing from the bottom of said second zone a mixture of vapors and solid particles and passing same to a third, heated, confined elongated zone of lesser cross-section which is maintained at an elevated temperature and a reduced pressure sufficient to vaporize residual liquid present on said particles and to maintain the flow of vapors and particles through said second zone at a velocity of from about 50 to about 400 feet per second, passing the vapor-solid particle effluent of said third zone into a fourth, heated, confined elongated zone of a sufficiently larger cross section than said third zone, to slow said effluent to a velocity of from 15 to 90 feet per second and provide a residence time in said fourth zone of at least two seconds and reduce the pressure of said effluent substantially to atmospheric, heating said fourth zone to an elevated temperature sufficient to heat said particles to at least 200° F., discharging the vapor-dry, heated solid particle effluent from said fourth zone into a collecting zone and recovering therefrom dry, heated solid particles at atmospheric pressures.

7. A method for depressurizing, drying, heating and recovering meltable solid polymer particles from a slurry of same in liquid hydrocarbon diluent and reactant, said slurry being used in a zone maintained at a pressure of from 100 to 700 p.s.i.a., comprising intermittently passing an increment of said slurry through an expansion zone into a first pipe zone, heating said first zone to a temperature of about 250° F., moving said increment along said first zone with a pressure gradient sufficient to accelerate said increment to a maximum velocity of at least 400 feet per second before reaching the end of said first zone, passing the increment from said first zone downwardly into a substantially vertical said second pipe zone of a volume sufficient to hold from 3 to 10 of said increments, maintaining said second zone at a pressure in the range of from 40 to about 50 p.s.i.a. so that no more than the largest and densest particles present in the increment will reach the bottom of said second zone before the next following increment from said first zone reaches the top of said second zone, heating said second zone at a temperature of about 250° F., continuously removing from the bottom of said second zone a mixture of vapors and solid polymer particles at the rate of from 1 to 4 feet per second, passing same to a third, heated, confined pipe zone of lesser cross-section than said second zone which is maintained at an elevated temperature sufficient to vaporize residual liquid present on said particles and a reduced pressure gradient of about 25 p.s.i.a., passing the effluent from said third zone to a fourth, heated, confined pipe zone of a sufficiently larger cross-section than said third zone to slow said effluent to a velocity of from 15 to 90 feet per second and provide a residence time of said effluent in said fourth zone of from 2 to 10 seconds and reduce the pressure of said effluent substantially to atmospheric, heating said fourth zone to a temperature of about 250° F., discharging the effluent from said fourth zone into a collecting zone and recovering from said collecting zone dry, heated solid polymer particles at atmospheric pressure.

8. The method according to claim 7 wherein said polymer particles are formed from at least one mono-1-olefin having from 2 to 8 carbon atoms per molecule.

References Cited

UNITED STATES PATENTS 3,201,365   8/1965   Charlesworth et al.
3,280,091   10/1966   Dance.

JOSEPH L. SCHOFER, *Primary Examiner.*

L. EDELMAN, *Assistant Examiner.*

U.S. Cl. X.R.

260—94.9, 88.2